United States Patent
Kannenberg et al.

[11] Patent Number: 5,637,336
[45] Date of Patent: Jun. 10, 1997

[54] PROCESS FOR DRYING MALT

[76] Inventors: James R. Kannenberg, N89 W16380 Cleveland Ave., Menomonee Falls, Wis. 53051; Bernard Fulayter, 3763 S. 55th St., Milwaukee, Wis. 53220

[21] Appl. No.: 234,860

[22] Filed: Apr. 29, 1994

[51] Int. Cl.[6] .......................... C12C 1/067; C12C 1/125; F26B 3/08; F26B 21/06
[52] U.S. Cl. .................. 426/231; 426/233; 426/237; 426/320; 426/467; 34/363; 34/364; 34/367; 34/370; 34/560; 34/579; 34/589
[58] Field of Search .............................. 34/361, 363, 364, 34/367, 370, 560, 579, 589; 426/231, 320, 237, 233, 467

[56] References Cited

U.S. PATENT DOCUMENTS

| | | | |
|---|---|---|---|
| 2,559,107 | 7/1951 | Bloxham | 34/370 |
| 3,012,331 | 12/1961 | Öholm et al. | 34/370 |
| 3,694,220 | 9/1972 | Pierce | 426/242 |
| 3,745,668 | 7/1973 | Vian-Ortuno et al. | 34/589 |
| 4,633,593 | 1/1987 | Wallis | 34/26 |
| 4,982,511 | 1/1991 | Frei | 34/33 |

FOREIGN PATENT DOCUMENTS 937461  9/1963  United Kingdom .

OTHER PUBLICATIONS

J.S. Hough et al., Malting & Brewing Science, Chapman and Hall Ltd, London, 1973, pp. 159 & 160.
G. Hawley, The Condensed Chemical Dictionary, 10th Ed. Van Nostrand Reinhold Co., New York, p. 572, 1982.
Robert Perry, Perry's Chemical Eng. Hanbook, 6th Ed. McGraw-Hill Book Co., pp. 20-42 and 20-43, 1984.

*Primary Examiner*—Esther Kepplinger
*Assistant Examiner*—Curtis E. Sherrer

[57] ABSTRACT

A process and apparatus for the drying or kilning of malt in a substantially continuous operation. The malt is transported through one or more separate drying zones by means of fluid bed dryer units at which time tempered or conditioned air at a predetermined temperature and moisture content is passed through the malt to effect a drying of the malt. The rate of malt movement through the drying zones is varied according to the moisture content of the malt at predetermined points in its travel whereby to acheive a desired drying rate and moisture content in the malt as it travels through the various drying zones. Sulfur dioxide gas is selectively infused with the air in the drying zones to minimize carcinogens within the malt. Optional treatments are provided for the malt as it passes through the drying zones, including subjecting the malt to a vacuum to facilitate moisture removal and to effect a sanitizing of the malt. The malt may also be subjected to an irradiation treatment as it moves through the drying zones in order to eliminate insects and other harmful microbes in the malt.

8 Claims, 2 Drawing Sheets

PROCESS FOR DRYING MALT

BACKGROUND OF THE INVENTION

This invention is directed to the drying of malt for use in the brewing, distilling, food and other industries and more particularly concerns a method and apparatus for the drying or kilning of malt utilizing fluid bed type dryer units supplied with conditioned air for carrying out a controlled, substantially continuous drying of the malt. Various optional devices are associated with the dryer units to promote energy efficiency in the drying/kilning process and to "brighten", and clean and purify the malt in an environmentally acceptable manner as it passes through the drying zones.

In the drying of malt, it is critically important to achieve both a deliberate drying of the malt and a precise moisture control during the drying process of the temperature in the drying zones so as to develop desired qualities and characteristics in the malt as this will in turn greatly effect the flavor and quality of the end product. Generally, the majority of present day malt drying facilities are of the static or batch-type, employing either single deck kilns or double deck kilns to receive a charge of green malt and having perforated floors allowing air to flow through the malt to effect drying. Malt drying patterns usually proceed in two phase fashion, the first phase being from twelve to seventeen hours of duration at low temperatures, in the range of say approximately 130 to 140 degrees Farenheidt, and with a high rate of air flow, followed by a second phase usually five or more hours in duration at elevated temperatures, ranging approximately from 180 to 185 degrees Farenheidt, with low air flow rates. The exact number of hours in each drying phase, the rate of air flow and temperature of the air employed in any particular instance depend upon a number of different factors, including the variety of malt used and the characteristics desired in the finished malt, among others.

The first drying phase occurs in a single kiln bed for single deck kiln systems and in the upper or top kiln bed of a double deck kiln arrangement. This initial phase, also referred to as the constant rate drying phase, has for its purpose the drying of malt with a beginning moisture content of 40 to 45% to a moisture content of about 8 to 12% during which the moisture removed per unit of time is fairly constant. Moisture removed during this first phase consists generally of unbound surface moisture as well as some bound moisture, that is, moisture exhibiting a vapor pressure lower than pure water and bound to the malt surface by forces such as chemical or physical adsorption, capillary action, solution within cells, etc. After reaching the equilibrium moisture content, i.e. the moisture content at which the water vapor pressure of the malt equals the partial pressure of the water in the ambient air and is independent of temperature in the range of 60 to 100 degrees Farenheit, the next drying phase, also known or referred to as the declining drying rate phase, is usually begun.

In a single deck kilning system, the second phase of drying is begun immediately after the first phase in the same kiln bed or floor. In a double deck kiln system, the first phase is completed in the upper deck and the second phase is completed in the lower deck. The finished malt, having undergone the second phase, is removed from the lower deck or floor, after which the malt in the upper deck, having undergone the first drying phase, is dropped to the lower deck. A new batch of green malt is then loaded into the upper deck to initiate a subsequent drying cycle. The second drying phase is dependent more on increased temperatures rather than air flow to remove the remaining moisture bound within the malt. The goal of the second phase is to acheive a final moisture content of approximately four percent (4%) depending upon the malt variety and desired specifications. The secondary drying phase is also important in developing flavor, color and certain enzyme characteristics important to the end user of the malt.

Single deck kiln systems typically operate on a 24 hour cycle including loading and unloading procedures. Double deck kiln systems typically run on a 48 hour cycle, unloading a finished batch of malt every 24 hours. In a double deck kiln arrangement, the first 12 to 17 hours of drying are part of phase one, primarily drying in the upper deck though some drying may still occur on the lower deck. The next five to six hours of drying are phase two wherein elevated temperatures dry the lower bed while cool air is passed under the upper bed to protect against unnecessary, undesirable enzyme deterioration of the still undried malt in the upper bed.

Other malting systems are available such as partition kilns, combination germination/kilning beds and triple deck kilns, but the trend in North America still is towards single and double deck kilns. Further detailed technical information concerning known malt drying methods can be obtained from organizations such as the Master Brewers Association of America and from technical/specialist literature, including patents such as U.S. Pat. No. 4,982,511, for example.

These conventional batch type kiln dryer arrangements while generally satisfactory from the standpoint of producing a deliberate, controlled drying of the malt are noted as being relatively inefficient insofar as energy technological advances in this area, there is a definite need for more energy efficient systems in the malting industry. This need is prompted in part by the high cost of energy and the public and government concern for energy conservatism in all aspects of business and industry.

In the drying of malt, it is known to subject the malt at one stage or another in the drying process to sulfur dioxide for the purpose of eliminating or reducing naturally occurring carcinogens in the malt by acidifying the surface membrane of the malt grains. Sulfur dioxide also affects the "brightness" or overall finished appearance of the dried malt. Normally, the sulfur dioxide is produced by burning sulfur in open pans and venting the end product to the kilns along with the air being used to dry the malt. A portion of the sulfur dioxide is absorbed by the malt and the rest is vented to the atmosphere. However, present day concerns for air quality and ever increasing governmental regulations concerning pollutants in the atmosphere dictate the need for an improved system for accomplishing this particular aspect of the malt drying and/or preparation process.

Similarily, in some known malt drying and preparation processes, it is known to treat the malt with various pesticides to minimize or eliminate insect infestations in the grains. Here again, increasing environmental concerns have brought about a spate of regulations restricting the use of many pesticides and carefully regulating the permissible manner in which such pesticides may be dispersed. For this reason, increasing attention has been given to the development of alternative techniques for carrying out this phase of the malt drying/preparation process.

DISCLOSURE OF THE INVENTION

The present invention provides a process and apparatus for effecting the drying of malt on a continuous or substantially continuous basis through the use of fluid bed type dryer units provided with conditioned air at predetermined temperatures and flow rates and which utilize air recirculation in and between the various drying units to reduce energy requirements in the overall drying process.

A further object of the invention is the provision of a malt drying process and apparatus therefor incorporating various options including, inter alia, a vacuum chamber or zone for subjecting the malt to reduced vapor pressure both to facilitate moisture removal and to assist in the sanitization of the malt and a sulfur injection and recovery system for subjecting the malt to sulfur dioxide without attendant contamination of the atmosphere. A further option consists of an irradiation system designed to reduce the presence of insects and other harmful microbes in the malt without the necessity of pesticides and the harmful side effects of the same on the environment.

Other objects and advantages of the invention are the provision of a malt drying system and apparatus having means for automatically adjusting the flow rate and temperature of the drying medium from and between the various drying zones in accordance with the moisture content of the malt at any particular stage whereby to adjust the drying rate of the malt and the final moisture content in accordance with production requirements and customer specifications.

A still further object of the invention is the provision of a malt drying and production system wherein the malt is moved in continuous or substantially continuous fashion through one or more separate drying zones and monitored in order to better match the output of dried malt with the production requirements of the malting facility.

These as well as other objects and advantages of the invention are acheived by utilizing one or more fluid bed type dryer units arranged in seriatim with one another and adapted to receive green malt and move the same continuously or substantially continuously through a series of drying zones defined by the individual dryer units. The drying units are provided with conditioned air which is directed upwardly through the malt to fluidize the same for efficient, controlled drying action. The malt is initially exposed to air having a high flow rate and relatively low temperatures, below 140 degrees F., designed to complete the primary drying phase of the malt. In this phase, the moisture content of the malt is reduced from an initial content of from 40 to 45% to a level of from 8 to 12%, depending on the varietal type of grain being processed and the characteristics desired in the final malt product.

During this first phase, sulfur dioxide may be injected from a suitable source of the gas into the malt stream along with the air used to carry out the drying of the malt. This step may be repeated at a subsequent part of the malt drying process or in lieu of the injection as aforesaid. The timing and amount of sulfur dioxide used is variable depending upon moisture content, grain variety, desired characteristics in the finished malt, the malster's personal philosophy concerning malt and its role in the overall brewing process, etc. It is proposed to utilize sulfur dioxide from a storage tank to allow a pure source of the gas free from undesirable contaminants and pollutants, such a source of sulfur dioxide also permits a precise, rate controlled application of the gas to the malt as it moves through the fluid bed dryer system.

The sulfur dioxide injection system is coupled with a sufur dioxide recovery system in the form either of a cross-flow membrane or a suitable filter system which serves to recover any sulfur dioxide not absorbed by the malt. This allows for reduced toxic emissions and/or permits excess sulfur dioxide to be purified and reused. Alternatively, the excess sulfur dioxide gas may be disposed of properly through the use of such recovery system.

The rate at which green malt is fed into the system of the invention depends on the number and size of the fluid bed dryer units being employed in any specific application, the temperature and/or the air flow conditions, to mention a number of the relevant variables. Optimally, the feed rate of the green malt equals the rate at which the green malt is being unloaded from the germination beds thereby to allow a continuous flow of finished product within the general realm of a scheduled production shift. The number of fluid bed dryers or other similar type units is also limited by space constraints. By way or example, in an embodiment of the invention, a complete system formed according to the aforementioned parameters to carry out the drying of malt at the rate of 2,000 bushels per hour requires four dryer bed units each approximately 8 feet wide by 100 feet long. It will be appreciated that if space allowed, a multiplicity of dryer units of the type described could be used to increase the production capacity of any given system to meet or match the any particular malting facility. The energy savings of the system of the invention are approximately 93 to 93% as compared to a conventional double kiln system having a comparable production output or capacity. The energy requirements in a specific instance range between 4,000 to 10,000 STU/bushel for the system of the invention vis-a-vis 60,000 BTU/bushel for a prior art, double kiln type system. The time savings of the given example are approximately 66% as compared to a single deck kiln system and 83% as compared to to a double deck kiln arrangement, not taking into account any lag time for storage procedures, maintenance, etc.

After the initial drying phase is completed, the malt is subjected to the declining drying rate phase where increased temperature and decreased air flow serve to remove the remaining excess moisture in the malt as necessary to produce a final moisture content of approximately 4%. Variations in air temperature and air flow rates are made if need be or if desired to allow for specialty malts and/or the development of desired characteristics in the final product. The second phase drying may take place in the same fluid bed dryer as the first phase, or in other embodiments of the invention, such drying may be conducted in one or more additional such dryer units.

In accordance with a particular feature of the invention, the malt in the course of movement through the drying zone or zones is exposed to an irradiation system which functions to sanitize the malt whereby to reduce the possibility of microbial and/or insect infestations in the malt. This decreases or eliminates the need for pesticides heretofore used for sanitation and storage in the malting industry. Due to increased public concern and ever increasing stringency in governmental regulations relative to pesticide use, this irradiation step constitutes a highly useful and advantageous adjunct to the malt drying process.

A further feature of the invention involves subjecting the malt as it is processed in the system to a vacuum for the purpose of facilitating moisture removal from the malt and/or to also aid in the sanitation of the malt by causing any insect eggs present in the malt to burst thereby preventing later maturation of the same. It is contemplated to divert the malt, a batch at a time, from its normal path or course of travel through the drying zone or zones to and within a vacuum chamber for exposure to the vacuum for a predetermined period of time or interval. The diverted malt would thereafter be directed back into the main path of travel through the drying zone or zones. The vacuum chamber and associated loading and unloading devices may be located at one or more positions along the fluid bed dryer units as desired.

As the malt proceeds through the drying zone or zones, it is subjected to a flow of air, the flow rate and temperature of which may vary from one point to another along the length of the drying zone or zones depending upon the particular drying pattern desired in any given production run of malt. In a multiple type drying zone wherein differing temperatures and air flow rates are being used, the invention contemplates recirculating the air exhausting from one zone through one or more other drying zones in order to conserve energy and render the system more energy efficient. The recirculation allows air of lower moisture content exhausting from one zone to effect drying of malt having a higher moisture content in another drying zone. Alternatively, the moist air exhausting from one or more zones may be directed to recovery units where the latent heat in such air may be used to heat air being directed to the input side of a drying zone, thus saving the energy required to condition the incoming air.

Suitable moisture sensor and/or analysis devices are incorporated into the malt drying system of the invention to monitor the moisture content of the malt at various points in the drying zone or zones. Controls are tied into the sensors and/or moisture anaylsis devices to automatically regulate and/or adjust the temperature and the flow rate of the air being used to dry the malt to provide a controlled, efficient drying process. Similarily, the sensors and/or moisture analysis devices may be linked to controls for the drive mechanisms of the fluid bed dryer units so as to vary the rate of malt movement through the drying zones in accordance with moisture content at various points in the drying zone or zones, whereby to produce a controlled rate of drying in the malt. Currently available moisture analysis systems operate to determine moisture content by measuring the relative humidity of the air exhausting from the drying zone or zones as compared with the relative humidity of the incoming air. Other such systems determine moisture content by using the dielectric constant of the water within the malt and comparing the resultant reading with calibration curves via a microprocessor.

The malt is fed into the initial fluid bed dryer by a suitable loader and is moved between the dryers by transfer conveyers. An unloader is provided to remove the finished product and transport the same to storage or other desired processing station. The loader, unloader and transfer conveyors are adapted to provide temorary holds on the movement of the malt into, through and from the system in cases where there is an excess supply of malt in the system at any particular time. Provision is also made for handling an overflow of malt from the system in case of delays in the processing of the malt after leaving the last of the fluid bed dryers.

The overall system of the invention has the capability to completely dry malt as well as subjecting the malt to one or more optional treatments in moving through the drying zones. The system of the invention may be used, if desired, to only partially dry malt. This may entail drying the malt to a certain moisture level only and thereafter finishing the drying in a conventional kiln type arrangement. Alternatively, the invention may be employed to finish drying malt which has previously been partially dried in a conventional kiln. The flexibility of the invention in its various embellishments allows its use in all aspects of the drying and preparation of malt.

BRIEF DESCRIPTION OF THE DRAWINGS

The accompanying drawings illustrate the best mode presently contemplated of carrying out the invention wherein.

DESCRIPTION OF PREFERRED EMBODIMENT

Figure 1:
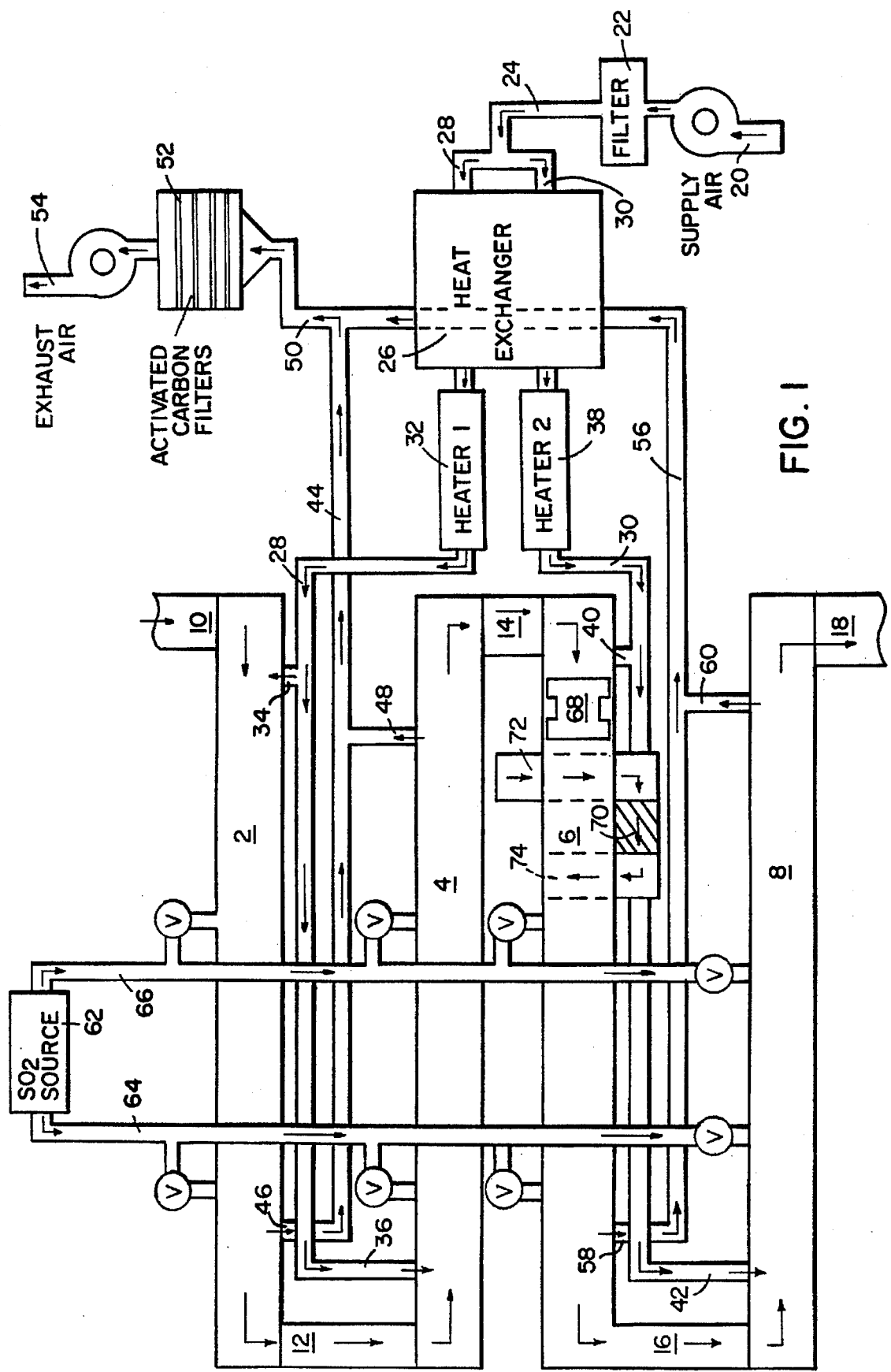
FIG. 1 is a schematic flow sheet of the malt processing/drying system of the invention.

The arrangement of components shown in the drawings as well as any given values set forth in the ensuing description of the invention are for sake of example only and are by way of enabling a broader understanding of the present inventive concepts; it being understood that in practice the particular requirements and/or limitations of the malt facility will largely control the actual lay-out and/or configuration of the components making up the system of the invention.

Referring now to the drawings and to FIG. 1 in particular, the illustrated embodiment of the invention includes a number, four in this case, of fluid bed dryer units 2,4,6 and 8 defining separate and distinct malt drying zones arranged in parallelism with one another. The dryer units are connected to one another in to form a continuous processing path for the malt by transfer units 10,12,14,16 and 18. Transfer unit 10 serves to receive green, incoming malt and direct the same into fluid bed dryer unit 2. From dryer 2, the malt passes to transfer unit 12 and is fed thereby into dryer unit 4. After passing through dryer unit 4, the malt passes to and through dryer units 6 and 8 by way of transfer units 14 and 16 respectively. Upon completing passage through fluid bed dryer unit 8, the malt passes onto transfer unit 18 for delivery to a storage facility, not shown, or other desired area for further processing.

As the malt passes through each of the fluid bed dryer units 2,4,6 and 8, it is subjected to a heated air stream designed to effect a controlled drying of the malt. Air from a source or supply 20 is directed through a suitable filter 22 by way of conduit or line 24. Air line 24 in the illustrated embodiment of the invention is shown connected to a heat exchanger 26 by a pair of branch lines 28 and 30. Line, 28 passes from heat exchanger 26 through a heater 32 from where it is directed to fluid bed dryer units 2 and 4 by way of the branch lines 34 and 36, respectively. Supply air to the other of the fluid bed dryer units, namely, units 6 and 8, flows through line 30, in and through heat exchanger 26 and then through another heater 38. From heater 38, air passes by way of branch lines 40 and 42 respectively in the aforesaid air line 30 to the units 6 and 8. Air is exhausted from the fluid bed units 2 and 4 by a line 44 having separate branches 46 and 48 connected to units 2 and 4 respectively. Line 44, in turn, is connected by way of a main exhaust line 50 to a filter unit 52 having an associated exhaust fan 54 pulling air through the filter, exhaust lines and fluid bed units as set forth. Similarily, air is exhausted from the remaining fluid bed units 6 and 8 by way of a line 56 connected with units 6 and 8 by the branch lines 58 and 60 respectively. Line 56 leads to and through heat exchanger 26 and joins with the aforesaid main exhaust line 50.

Air directed to the upstream-most of the dryer units 2 and 4 will generally be at a temperature within the range of 130 to 146 degrees F. As the air flows from the supply 20 to and through heat exchanger 26 and then through heater 32, it is heated to the desired temperature prior to moving into dryer units 2 and 4. The air to the downstream dryer units 6 and 8 is at a higher temperature, from 180 to 185 degrees F. in the typical malting operation, and is also passed through heat exchanger 26 and then to heater 38 where it is raised to the desired temperature level. Air exhausting from dryer units 6 and 8 is employed as the heating medium in heat exchanger 26 and thus some of the heat content of this air is reclaimed thereby promoting energy conservation in the overall drying process. Heat exchanger 26 and heaters 30 and 52 are of any conventional construction and are provided with suitable control devices, not shown, to provide for the desired heating of the supply air.

Various optional or accessory devices and systems are adapted to be incorporated into the system of the invention to effect differing desired treatments of the malt in the course of movement through the dryer units. A first such option is in the form of a sulfur dioxide injection system functioning to inject controlled amounts of sulfur dioxide gas into the dryer units to thereby expose the malt as it is being dried to the sulfur dioxide gas for the purpose of eliminating or minimizing the amount of naturally occurring carcinogens which may be present in the malt. A source of sulfur dioxide gas is shown in the form of a supply tank 62 connected by way of conduits 64 and 66 to each of the dryer units 2,4,6 and 8.

Suitable shut-off valves and ancillary controls, not shown, normally are provided in the various inlet or supply lines 64,66 to permit controlled amounts of sulfur dioxide to be selectively applied to the various fluid bed dryer units 2,4,6 and 8 to carry out the desired degree of sulfur dioxide gas absorption by the malt as it moves through therethrough. Any unabsorbed sulfur dioxide will pass out of the fluid bed dryer units through the previously described exhaust lines 46,48,58 and 60 associated with the dryer units 2,4,6 and 8, respectively, and will ultimately pass into and through filter 52. In a preferred form of the invention, filter 52 is of the activated carbon type designed to selectively filter out substantially all the sulfur dioxide gas from the air drawn out of the dryer units.

A further option incorporated into the illustrated embodiment of the invention consists of an irradiation unit or device 68 designed to subject the malt to radiation as it passes the unit to effect the destruction of harmful microbes and/or pesticides which may be present in the malt. Radiation unit 68 is shown by way of example only as being associated with fluid bed dryer unit 6. Additional such units 68 may be employed in the system as desired depending upon system requirements and overall sanitation conditions in the malt being processed.

Also associated with fluid bed dryer 6 is a vacuum system 70 designed to expose the malt to a vacuum as it moves through the system to aid in the drying of the malt by allowing bound moisture within the malt grain to be driven toward the surface under the influence of the reduced vapor pressure of the surrounding air. A reduced energy requirement is thus produced along with a shortened drying time for the malt. The vacuum system or device serves secondarily to cause any insect eggs present in the malt to burst open under the reduced vapor pressure in the ambient air, thus aiding and assisting in the elimination of harmful contaminants in the malt while obviating the necessity of utilizing pesticides to acheive this end. The vacuum will vary according to circumstances but generally a vacuum of less than one atmosphere will suffice and in the typical instance the vacuum need not exceed several inches of Mercury. Additional transfer units 72 and 74 are provided for shunting pretermined amounts of malt from the dryer bed to the vacuum chamber as and when required and for thereafter returning the malt back to bed 6 after exposure to the vacuum.

Figure 2:
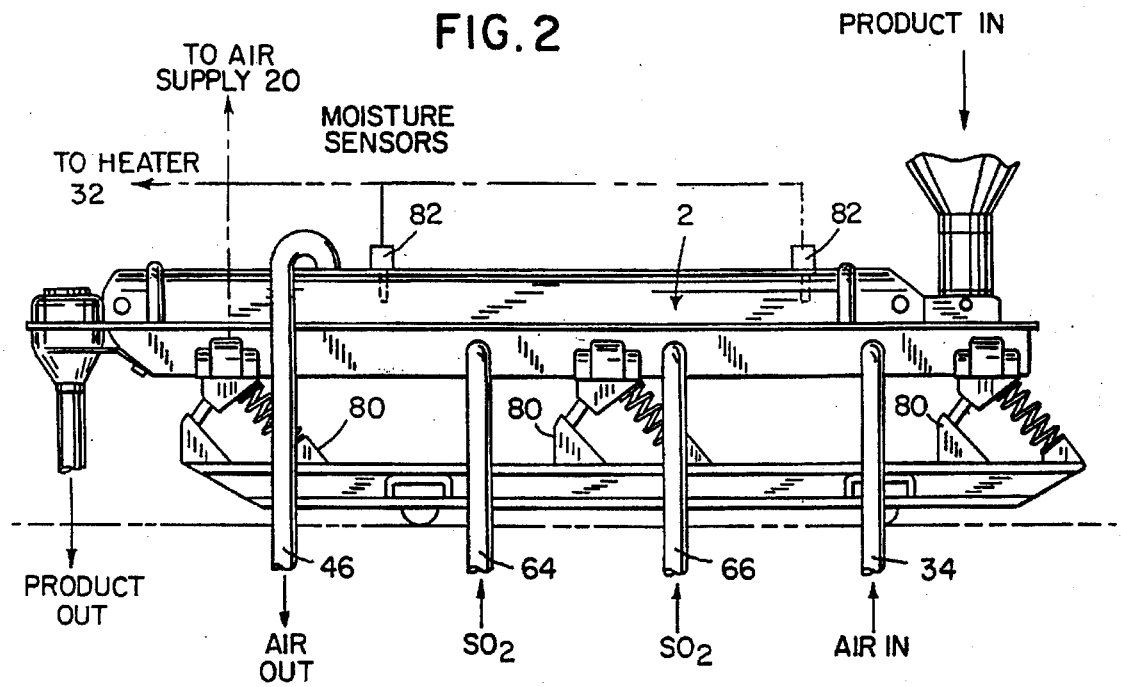
FIG. 2 is a side elevation of one of the fluid bed dryer units used in the invention for the drying of malt.
Figure 3:
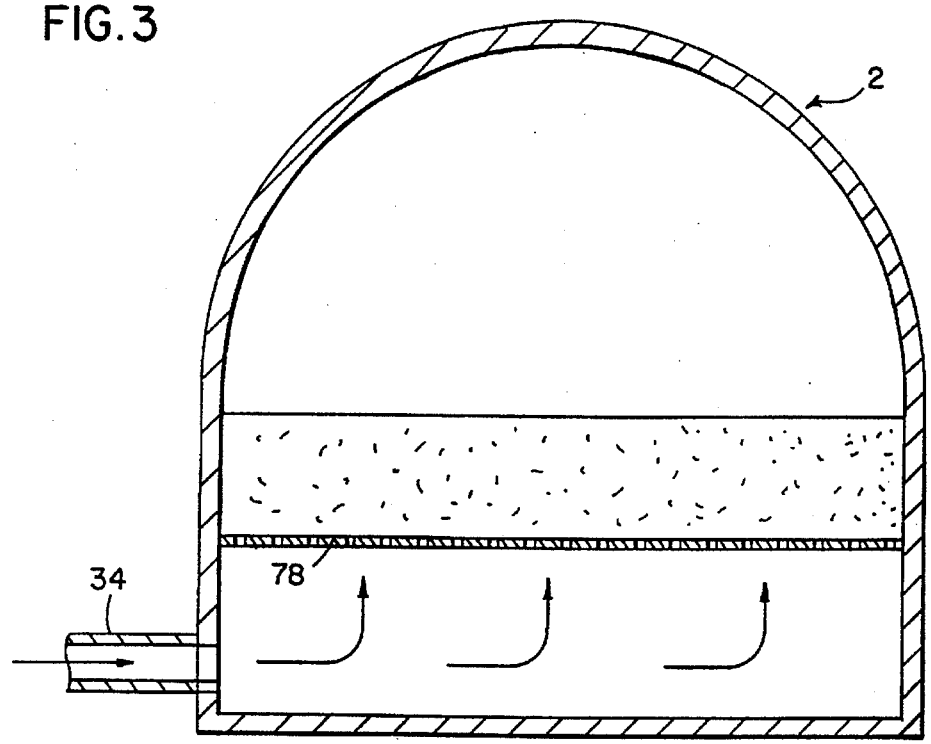
FIG. 3 is a cross-sectional view of the fluid bed dryer shown in FIG. 2.

Reference may now be made to FIGS. 2 and 3 showing a more detailed construction of one of the fluid bed dryer units. Each such unit includes an enclosed processing plenum 76 having a perforated floor 78 adapted to receive the malt or other product which is to be processed in the unit. Units are equipped with a number of vibratory drive mechanisms, indicated generally by the reference numeral 80, for controlling the rate at which product is moved through the plenum; the speed and amplitude of the vibratory drives being controlled through a voltage regulator or variable speed motor, as desired, to gently convey the malt at a desired or regulated rate through the units and to produce or provide for any particular application a given retention time of the malt in the respective drying units. Fluidized bed dryer units of the type utilized in the invention are well known in the drying of fragite products and are available from a number of different manufacturers. One such manufacturer is the Damrow Company of Fond du Lac, Wis.

Various configurations of the processing plenums of the dryer units may be employed depending upon the particular requirements of the malt drying process. The plenum, for example, may be subdivided into several separate compartments with each such compartment having a separate air intake and a separate air exhaust manifold, thereby enabling the use of air at differing temperatures and flow rates from one compartment to the next in each of the individual dryer units if desired. For present purposes, it will be assumed that each of the dryer units has a single processing chamber or plenum only and that the air used to fluidize and dry the malt in any particular dryer unit is supplied thereto at a substantially constant temperature and flow rate.

As the malt is moved through the individual fluid bed dryer units, the moisture content of the malt is periodically monitored through a series of moisture sensors, indicated generally by the reference numeral 82 in FIGS. 2 and 3, dispersed along the length of the individual dryer units as shown. Any known type of moisture sensor may be utilized and suffice it to state that the sensor operates to automatically determine the moisture content of the malt as the malt moves therepast and to provide a suitable signal capable of triggering a response in a control valve, motor, or other actuator to obtain a desired result in a particular variable of the system. For example, the moisture readings obtained from the sensors in the dryer units may be utilized to vary the rate of travel or the malt through the dryer units in a manner as will produce a given rate of drying in the malt as it travels through the units and/or a given moisture content in the malt as it completes travel through any one or more of the dryer units. The moisture readings may likewise or alternatively be used to control the temperature and/or flow rate of the air being introduced into the dryer units so as to produce a desire drying rate of the malt in moving therethrough and/or a given final moisture content in the malt in any particular portion of its movement through the system as a whole.

A brief description of the overall operation of the system described above is set forth herein to enable a clearer understanding of the nature of the invention. Malt requiring drying enters the first fluid bed dryer unit 2 by way of loading device 10. As the malt progresses through unit 2, it is subjected to drying by heated air entering the unit by way of conduit 28. In passing through unit 2, the moisture content of the malt is monitored by the individual sensor devices 82 located therein and any necessary adjustments in the rate of malt travel and/or the temperature and flow rate of the air used to dry the malt are made to provide a predetermined rate of drying in the malt and/or a given final moisture content in the malt as it completes travel through unit 2.

Sulfur dioxide may be injected into the malt in the course of travel through unit 2 by way of the conduits 64 and 66 with excess, unabsorbed sulfur dioxide being drawn off with the flow of drying air after it passes through the malt and directed to activated carbon filter 52 by way of conduit 44. As the malt completes movement from the unit, it is transferred to dryer unit 4 where a similar drying action, monitoring and sulfur dioxide application take place. In the example of the invention, the first drying phase of the malt takes place in units 2 and 4 with the moisture content being reduced from an initial a content of from 40 to 45% to approximately 8 to 12%. The second phase of the malt drying takes place in fluid bed dryer units 6 and 8 wherein further drying is accomplished under elevated temperatures and reduced air flow rates. Additional monitoring of the malt moisture content occurs in the units 6 and 8 for the purposes set forth previously. The trait may be subjected to further treatment with sulfur dioxide gas in the units 6 and 8 though this ordinarily will not be practical in view of the reduced absorption of the malt due to decreased surface moisture in the malt at this point in its movement through the dryer units. In moving through unit 6, the malt may be subjected to irradiation for sanitation purposes by means of the irradiation unit 68. The malt at this same point in its travel through the drying process may also be shunted from the unit a batch at a time for exposure to a vacuum in unit 70, following which the malt would be returned to unit 6 for continued drying in the units 6 and 8. Air is recirculated from drier zones to wetter zones through the system of conduits, blowers, fans and the like described previously. Alternatively, exhaust air from the units may be directed to heat recovery units. The final moisture content of the malt in the example under discussion is in the range of 3 to 4%. The feed rate of malt in the present example was 2,000 bushels per hour with an energy expenditure of approximately 4,000 to 10,000 STU/bushel.

Various modes of carrying out the invention are contemplated as being within the scope of the following claims, particularly pointing out and distinctly claiming the subject-matter regarded as the nature of the invention.

We claim:

1. A process for drying malt, comprising the steps of moving malt continuously through a drying zone, subjecting the malt to conditioned air as it moves through said zone, the air being directed upwardly through said malt to fluidize the same, monitoring the moisture content of the malt at various points in its course of travel through said drying zone, and varying the travel rate of the malt through said zone in accordance with the moisture content of the malt whereby to produce a predetermined rate of drying in the malt and a final moisture content in the malt upon completion of travel through said zone.

2. The process of claim 1 including the step of varying the temperature of the air being used to dry the malt and the rate of air flow through the malt in accordance with the moisture content of the malt at any particular point in the course of its travel through the drying zone whereby to effect a given rate of drying in the malt and a predetermined final moisture content in the malt as it leaves the drying zone.

3. The process of claim 1 wherein the drying of the malt occurs in two separate stages, the first stage lowering the moisture content from an initial value of 40 to 45% to approximately 8 to 12% and the second stage lowering the moisture content to a final value of 3 to 4%.

4. The process of claim 1 in which the air being used to dry the malt is recirculated from one portion of the drying zone to another whereby to reduce overall energy requirements in the drying of the malt.

5. The process of drying malt, comprising the steps of:
    (a) passing malt continuously through a drying zone;
    (b) directing conditioned air through said malt as it is moved through said drying zone to effect moisture removal from the malt;
    (c) monitoring the moisture content of the malt at various points in its travel through said drying zone; and
    (d) varying the rate at which the malt is moved through said drying zone in accordance with the moisture content so as to produce a predetermined rate of drying in the malt concomitantly while controlling the moisture content of the malt at various points in the drying zone to produce desired characteristics in the finally dried malt.

6. The process of claim 5 including the step of subjecting the malt to controlled amounts of sulfur dioxide gas as the malt passes through said drying zone whereby to destroy any insects and harmful microbes in said malt.

7. The process of claim 5 including the step of recycling the air being used to dry the malt from one part of the drying zone to another whereby to reduce the overall energy requirements in the drying of the malt.

8. The process of claim 5 including the step of subjecting the malt to irradiation as it passes through said drying zone in order to destroy any insects and harmful microbes which may be present in the malt.

* * * * *